US011320310B2

(12) United States Patent
Siess et al.

(10) Patent No.: US 11,320,310 B2
(45) Date of Patent: May 3, 2022

(54) MULTISPECTRAL SENSOR AND METHOD FOR MULTISPECTRAL LIGHT SENSING

(71) Applicant: ams Sensors Germany GmbH, Jena (DE)

(72) Inventors: Gunter Siess, AE Eindhoven (NL); Dalibor Stojkovic, AE Eindhoven (NL)

(73) Assignee: ams Sensors Germany GmbH, Jena (DE)

( * ) Notice: Subject to any disclaimer, the term of this patent is extended or adjusted under 35 U.S.C. 154(b) by 0 days.

(21) Appl. No.: 16/978,307

(22) PCT Filed: Mar. 26, 2019

(86) PCT No.: PCT/EP2019/057622
§ 371 (c)(1),
(2) Date: Sep. 4, 2020

(87) PCT Pub. No.: WO2019/185649
PCT Pub. Date: Oct. 3, 2019

(65) Prior Publication Data
US 2021/0003448 A1 Jan. 7, 2021

(30) Foreign Application Priority Data

Mar. 29, 2018 (EP) .................................... 18165059

(51) Int. Cl.
*G01J 3/36* (2006.01)
*G01J 3/02* (2006.01)
*G01J 3/28* (2006.01)

(52) U.S. Cl.
CPC .............. *G01J 3/36* (2013.01); *G01J 3/0208* (2013.01); *G01J 3/0291* (2013.01); *G01J 3/2803* (2013.01)

(58) Field of Classification Search
CPC ...... G01J 3/0208; G01J 3/0291; G01J 3/0297; G01J 3/28; G01J 3/2803; G01J 3/36
See application file for complete search history.

(56) References Cited

U.S. PATENT DOCUMENTS 5,353,055 A * 10/1994 Hiramatsu ............. H04N 5/243
348/145
2015/0241274 A1 8/2015 Barnard
(Continued)

FOREIGN PATENT DOCUMENTS

| EP | 3171406 | 5/2017 |
| EP | 3301894 | 4/2018 |
| WO | 2016/125164 | 8/2016 |

OTHER PUBLICATIONS

European Patent Office, International Search Report for PCT/EP2019/057622 dated Jul. 25, 2019.
(Continued)

*Primary Examiner* — Hina F Ayub
(74) *Attorney, Agent, or Firm* — MH2 Technology Law Group LLP

(57) ABSTRACT

A multispectral sensor comprises an opaque housing having a first chamber with a first aperture and a separate second chamber with a second aperture. An optical emitter is arranged in the first chamber and is arranged to emit light of a specified wavelength or range of wavelengths through the first aperture. An optical sensor is arranged in the second chamber and arranged to detect received photons through the second aperture. A control unit is configured to initiate emission of light by the optical emitter and a measurement unit is configured to provide sensor signals generated by the optical sensor. The optical sensor comprises an array of sensor pixels of a first type and pixels of a second type. The pixels of the first type each have a different transmission characteristic, each generating a multispectral sensor signal, (Continued)

respectively. The pixels of the second type have a same transmission characteristic and each generate a compensation sensor signal.

23 Claims, 3 Drawing Sheets

(56) References Cited

U.S. PATENT DOCUMENTS

| | | | |
|---|---|---|---|
| 2017/0010160 A1* | 1/2017 | Rosen | G01J 3/26 |
| 2017/0186793 A1* | 6/2017 | Ockenfuss | G01J 3/0208 |
| 2021/0116300 A1* | 4/2021 | Goldring | G01J 3/0289 |

OTHER PUBLICATIONS

MMCS6CS,Color measurement sensor MMCS6CS MAZeT, http://www.industrialmarket.co.uk/color-measurement-sensor-mmcs6c . . . downloaded Apr. 9, 2018, 4 pages.

\* cited by examiner

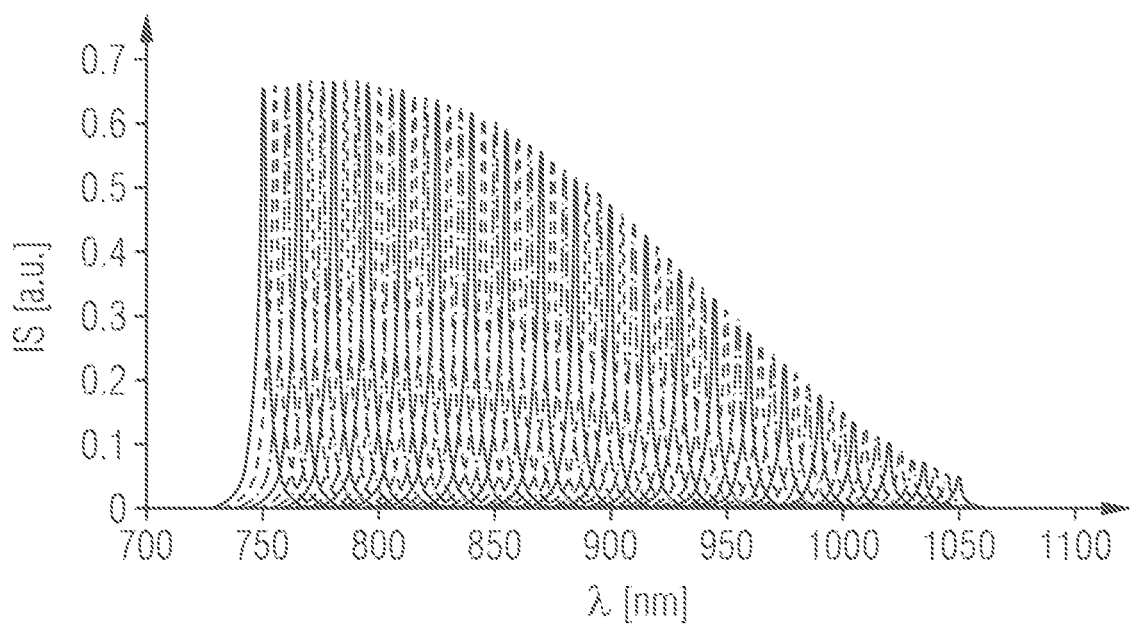

MULTISPECTRAL SENSOR AND METHOD FOR MULTISPECTRAL LIGHT SENSING

CROSS-REFERENCE TO RELATED APPLICATIONS

The present application is the national stage entry of International Patent Application No. PCT/EP2019/057622, filed on Mar. 26, 2019, which claims the benefit of priority of European Patent Application No. 18165059.9, filed on Mar. 29, 2018, all of which are hereby incorporated by reference in their entirety for all purposes.

This disclosure relates to a multispectral sensor and to a method for multispectral light sensing.

BACKGROUND OF THE DISCLOSURE

Color and spectral light sensing on a chip-scale have various applications in color identification, data authentication, spectroscopy, and other industrial and consumer-level optical detection applications. Common multispectral sensors are often based on an array of pixels and on-pixel filters for each pixel. For spectroscopic applications the filters can be chosen to have linear independent filter characteristics. In order to accomplish an accurate spectral measurement of a given target, radiance, e.g. fluorescence emission after excitation, should be the same for each pixel or a distribution of radiance should be known in order to compensate for different response of individual pixels. This way an amplitude of a spectral signal of a pixel can be used to calculate a spectral reconstruction of a target under study.

However, a homogenous distribution of target radiance on the pixel array is an ideal condition. In many situations the detector array is not evenly illuminated depending on measurement geometry, surface, shape and angle of the measurement sample, geometrical angel distribution of glossy and reemission and also the radiance distribution of the radiance source. In turn, target radiance may also deviate from the ideal condition. There is often a need to compensate for these effects.

Different measurement systems have been proposed. These systems are based on robust optical construction or strictly defined measurement geometries, e.g. measurements under defined angles such as 45°/0° or 22.5°/22.5°, or using an integrating sphere. Such systems are typical for color measurement with strictly fading out of glossy and constant measurement distances. For compensation of non-homogenous radiance distribution by optics, mixing using diffusers and optical lenses is one possibility. However, the field of view, FOV, and size ratio are often not practical. Other solutions employ image analyses using image cameras which may help to get additional information about the characteristic of a measurement surface. In low cost systems additional spacers for touching a surface are often used. But the market is increasingly demanding touchless measurements.

SUMMARY OF THE DISCLOSURE

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the multispectral sensor and the method for multispectral light sensing as defined in the accompanying claims.

The following relates to an improved concept in the field of multispectral light sensing. The improved concept provides a multispectral sensor and a method for multispectral light sensing which suggest implementing in a spectral measurement an additional detection of radiance distribution and/or gradient which may influence a signal response of pixels in a sensor array and may deform a spectral reconstruction in an unknown ratio. Additional compensation pixels are arranged in the sensor array and provide compensation signals which may be used to recalculate and compensate geometrical effects of the target, e.g. in touchless spectral measurements.

In at least one embodiment a multispectral sensor comprises an opaque housing, an optical emitter, an optical sensor, a control unit and a measurement unit. The opaque housing has a first chamber with a first aperture and a separate second chamber with a second aperture. The chambers are separate in the sense that light, e.g. direct emission from the optical emitter is blocked from reaching the optical sensor.

The term "optical" relates to electromagnetic radiation which can be described by geometrical (or ray) optics and physical (or wave) optics. This involves UV, VIS, or IR radiation, for example. For example, the multispectral sensor may operate based on generation, detection and/or processing of such electromagnetic radiation.

The housing comprises a mold material or otherwise optically opaque material, for example. The term "optically opaque" refers to an opacity to electromagnetic radiation, such as light with a specified wavelength within an emission wavelength range of the optical emitter. "Opaque" may further include opacity for infrared, visible and/or ultraviolet radiation, for example. Generally, hereinafter the expression "light" refers to electromagnetic radiation in the visible, VIS, infrared, IR, and ultraviolet, UV, spectrum, if not stated otherwise. The material of the housing may be opaque with respect to the emission of the optical emitter and emission from a fluorescent probe, for example.

The optical emitter is arranged in the first chamber and arranged to emit light of a specified wavelength or wavelengths range through the first aperture. For example, the optical emitter can be configured to emit pulses of light at a single or multiple specified wavelengths, i.e. narrowband emission. Furthermore, the optical emitter can be configured to emit light, e.g. pulses of light, at a range of specified wavelengths, i.e. broadband emission. The specified wavelength may be arranged to optically excite a fluorescent probe which can be positioned in the field of view, FOV, of the optical sensor.

The term "specified wavelength" denotes a known excitation wavelength which is used during a fluorescence experiment. For example, the optical emitter may have one or more emission lines. The specific wavelength used to excite the probe is then denoted "specified wavelength". Similarly, in case the optical emitter is tunable within a continuous or discrete range of wavelengths, the wavelength used to excite the fluorescent probe is also denoted "specified wavelength". Thus, both narrowband and broadband emission is envisaged. Examples of optical emitters include semiconductor diodes, laser diodes, and surface emitting lasers such as a vertical-cavity surface-emitting laser, VCSEL, a super luminescent diode, SLED, and the like.

The optical sensor is arranged in the second chamber and configured to detect received photons through the second aperture. For example, the optical sensor is arranged to detect photons which are emitted by the fluorescent probe. In other words the optical sensor is sensitive to a fluorescence emission from the fluorescent probe after the probe has been excited by the optical emitter.

Furthermore, the optical sensor comprises an array of sensor pixels of a first type and pixels of a second type. The pixels of the first type each have a different transmission characteristic. Thus, each pixel of the first type is arranged to generate a multispectral sensor signal, respectively. The pixels of the second type have the same transmission characteristic. Thus, these pixels each are arranged to generate a compensation sensor signal. The pixels or array of pixels may be individual photodiodes rather than a continuous component such as an image sensor, charge coupled-device or CMOS photo sensor, for example.

The control unit is configured to initiate emission of light by the optical emitter. For example, emission of the optical emitter can be modulated, e.g. pulsed or modulated by a continuous wave. In operation, the optical emitter emits light at the specified wavelength which illuminates a target outside the optical sensor, for example.

The measurement unit is configured to provide sensor signals which are generated by the optical sensor. In case the target comprises a fluorescent probe, molecules may be optically excited and, in turn, emit photons which eventually traverse back to the multispectral sensor where they are detected by the optical sensor. Thus, fluorescence can be excited by pulsed excitation, e.g. repetitively by short laser pulses.

The control unit and measurement unit are arranged in the same housing or package. These components may be implemented as control logic, a state machine, a microprocessor and the like. They may also comprise additional components such as analog-to-digital converters and amplifiers located in a same substrate. The substrate may have a printed circuit board providing electrical connection and communication to the individual components of the optical sensor.

In operation, the two different types of sensor pixels lead to two different sets of sensor signals, i.e. the multispectral sensor signals and the compensation sensor signals. The multispectral sensor signals can be combined into a spectrum. The sensor pixels of the first type each have a different spectral transmission characteristic. The transmission characteristic, or transmission curve, can be considered a mathematical function or graph that describes a transmission fraction of the pixel as a function of frequency or wavelength. Combining the multispectral sensor signals as a function of frequency or wavelength resembles a spectral distribution signal, or spectrum for short. For example, as discussed above a fluorescent probe can be placed in the field of view of the optical sensor to be optically excited by means of light emitted by the optical emitter. Emitted fluorescence may then be detected by one or more of the first type pixels and respective multispectral sensor signals are collected and evaluated, e.g. as a spectrum.

The spectrum may simply be a single signal or a set of signals. However, depending on the type of optical sensor and optics the spectrum may also resemble a spectral image of the probe. The pixels of the first type could also be denoted spectral pixels.

The pixels of the second type generate compensation sensor signals, respectively. The second type pixels have the same transmission characteristic. Different compensation sensor signals may be an indication of a non-homogenous target radiance distribution. For example, if a fluorescent probe is tilted with respect to the optical sensor the fluorescence emission may be different depending on a tilt angle. In other words, the compensation sensor signals may be mapping non-homogenous target radiance distribution. The pixels of the second type could also be denoted compensation pixels.

The proposed multispectral sensor allows for a spectral measurement by means of spectral pixels and an additional detection of radiance distribution and/or gradient which may influence the multispectral sensor signals generated by the spectral pixels. The additional compensation pixels generate compensation sensor signals which may hold information that allows for compensating the spectrum and establish a spectral reconstruction, e.g. with an otherwise unknown ratio. This compensation can be used to recalculate or compensate geometrical effects in touchless spectral measurements, for example.

In at least one embodiment the different transmission characteristics of the pixels of the first type are linearly independent. The pixels can be considered channels of the multispectral sensor. With linearly independent transmission characteristics only light of a defined wavelength is attributed to a certain channel or spectral pixel. For example, the transmission characteristics may be represented by a single linewidth or by a discrete set of linewidths, e.g. of a few nm such as 1 to 5 nm (FWHM). In terms of wavelengths the transmission characteristics of the spectral pixels are spaced apart such that there is no or only small spectral overlap, e.g. smaller than 1%. In other words, with linearly independent transmission characteristics of the pixels of the first type a detected photon may unambiguously be attributed to a respective pixel or channel. This facilitates creating a spectrum from the multispectral sensor signals.

In at least one embodiment at least the pixels of the first type each comprise a photodiode and a filter. The filter determines the transmission characteristic of the sensor pixel, respectively.

In at least one embodiment the filters are at least one of interference filters, dielectric filters, Fabry Perot filters and/or polymer filters.

In at least one embodiment the pixels of the second type are symmetrically distributed in the array of sensor pixels. For example, the pixels may be distributed with respect to the center of the array of sensor pixels and may have a same distance with respect to the center. It may also be possible to distribute the pixels according to several subsets, wherein each pixel from a given subset has a same distance to the center.

In at least one embodiment the pixels of the second type are located in corners of the array of sensor pixels.

In at least one embodiment additional pixels of the second type are located outside of the array of sensor pixels. For example, the additional pixels may be single photodiodes that are operatively connected with the array of sensor pixels.

In at least one embodiment the pixels of the second type each comprise a photodiode and a filter, wherein the filter determines the transmission characteristic of the sensor pixel, respectively. Alternatively, the pixels of the second type may only comprise a photodiode, i.e. without a filter provided with the diode.

In at least one embodiment the multispectral sensor comprises a processing unit which is arranged to determine a radiance distribution signal depending on the compensation sensor signals. Furthermore, the processing unit is also arranged to determine a spectral distribution signal depending on the radiance distribution signal. For example, the processing unit may combine the multispectral sensor signals as a function of frequency or wavelength to resemble the spectral distribution signal, or spectrum for short. The spectrum may then be compensated with the radiance distribution signal.

In at least one embodiment the multispectral sensor comprises output terminals to provide the compensation sensor signals and/or multispectral sensor signals for further processing. For example, instead of a dedicated processing unit provided in the same housing of the multispectral sensor, the compensation sensor signals and/or multispectral sensor signals can be provided to an external component, such as another processing circuit, control logic, a state machine, a microprocessor or an application-specific integrated circuit, ASIC.

In at least one embodiment an optical lens array is coupled to the array of sensor pixels. In addition, or alternatively, an optical lens is coupled to the first aperture of the opaque housing.

In at least one embodiment a method for multispectral light sensing employs a multispectral sensor comprising an opaque housing having a first chamber with a first aperture and a separate second chamber with a second aperture. The method comprises the step of emitting light of a specified wavelength by means of an optical emitter and through the first aperture. The optical emitter is arranged in the first chamber. Received photons are detected through the second aperture by means of an optical sensor, which is arranged in the second chamber. The optical sensor comprises an array of sensor pixels of a first type and pixels of a second type.

For each pixel of the first type a multispectral sensor signal is generated, wherein the pixels of the first type each have a different transmission characteristic. For each pixel of the second type a compensation sensor signal is generated, wherein the pixels of the second type have a same transmission characteristic. Then, a radiance distribution signal is determined depending on the compensation sensor signals. Finally, a spectral distribution signal, or spectrum, is determined depending on the radiance distribution signal.

In at least one embodiment the radiance distribution signal is combined with the multispectral sensor signals by means of a mathematical operation. The mathematical operation may include adding, subtracting, multiplying or dividing or more complex operations. For example, complex operations may be compared to a flat-field correction which may involve combining the compensation sensor signal individually or as the radiance distribution signal.

In at least one embodiment the radiance distribution signal is determined by means of a radiance distribution function. For example, the compensation sensor signal can be input into a model defined by the radiance distribution function. Often a radiance distribution signal is expected to be of a certain function. For example, this function may represent a plane or hyperbolic function. The measured compensation sensor signals can be considered as parameters that help determining the radiance distribution function and, thereby, derive the radiance distribution signal. This procedure may be considered a fitting operation to determine the radiance distribution function. The resulting radiance distribution signal can be used to calibrate the spectrum. Furthermore, radiance distribution signal can be used to extract additional information, such as tilting of the measured target, shape of the measured target, ratio of glossy and remission, and distance from target, e.g. by knowing of the radiance distribution of the optical emitter.

In at least one embodiment the step of determining the radiance distribution signal and/or determining the spectral distribution signal is executed external to the optical sensor or, alternatively, by means of a processing unit which is comprised by the multispectral sensor.

Further implementations of the method for multispectral light sensing are readily derived from the various implementations and embodiments of the multispectral sensor and vice versa.

In the following, the principle presented above is described in further detail with respect to drawings, in which exemplary embodiments are presented.

In the exemplary embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

BRIEF DESCRIPTION OF THE DRAWINGS

FIG. 5 shows example transmission characteristics of sensor pixels for a multispectral sensor.

DETAILED DESCRIPTION

Figure 1:
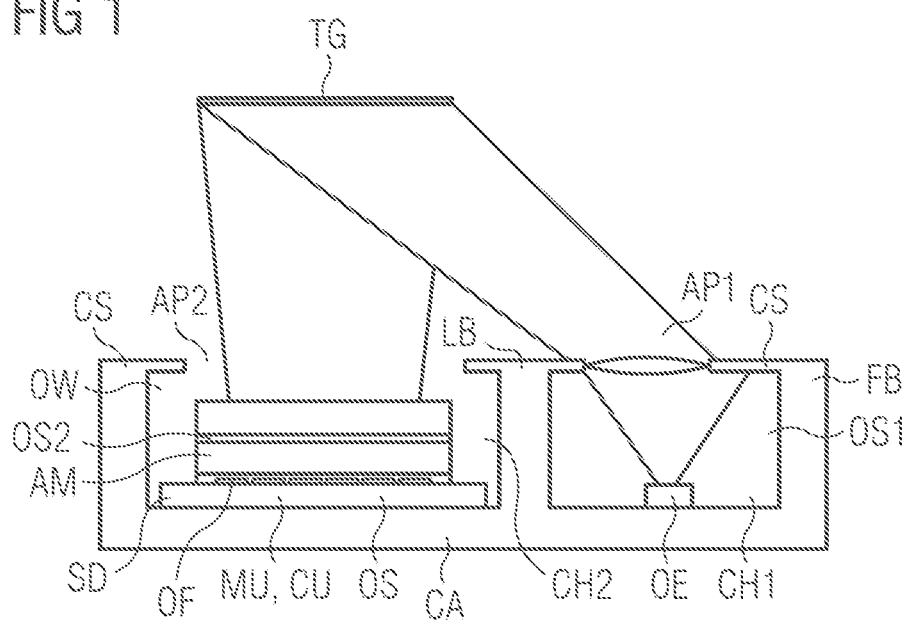
FIG. 1 shows an embodiment of a multispectral sensor.

The multispectral sensor comprises an opaque housing OH with two chambers: a first chamber CH1 and a second chamber CH2.

The opaque housing OH is arranged on a carrier CA and comprises a light barrier LB which divides the housing into the first and a second chamber CH1, CH2. The first and second chambers CH1, CH2 are further confined laterally by a frame body FB arranged in the housing. A cover section CS is located opposite to the carrier CA and thereby covers the chambers CH1, CH2. The cover section CS, the frame body FB, and the light barrier LB are manufactured by a continuous piece of material, such as a mold material, for example.

The carrier CA provides mechanical support and electrical connectivity to electronic components which are integrated into the multispectral sensor. For example, the carrier CA comprises a printed circuit board, PCB (not shown). However, in other embodiments (not shown) the carrier CA can also be part of the housing and electronic components are embedded into the housing by molding for example.

An optical emitter is located inside the first chamber CH1. The optical emitter OE is arranged on and electrically connected to the carrier CA, e.g. to the PCB. The optical emitter OE is a laser diode, such as a VCSEL or VECSEL, for example. These types of lasers are configured to emit light at a specified wavelength, e.g. in the UV, visual or infrared part of the electromagnetic spectrum. In some embodiments the optical emitter OE is tune able to emit within a range of specified wavelengths. The specified emission wavelength, or an emission spectrum, lies in the IR or UV/Vis. The emission may be narrow- or broadband. For example, vertical-cavity surface-emitting lasers, VCSEL, or vertical-external-cavity surface-emitting-lasers, VECSEL, predominantly emit in the IR, e.g. at 940 nm.

An optical sensor OS is arranged inside the second chamber CH2 and on the carrier CA. In this embodiment, the optical sensor is integrated into a single semiconductor die SD together with other electronics discussed further below. The optical sensor comprises an array of pixels which will be discussed in further detail below. The pixels may be implemented as photodiodes, for example. The optical sensor OS comprises an array of sensor pixels of a first type Spx and pixels of a second type Cpx. The pixels of the first type Spx each have a different transmission characteristic whereas the pixels of the second type have a same transmission characteristic.

An array of optical filters OF is arranged in the second chamber above the optical sensor OS. The array of optical filters OF is attached to the optical sensor OS. The pixels of the first type Spx each are associated with an optical filter having a different transmission characteristic. The pixels of the second type, however, are either associated with optical filters having have a same transmission characteristic or are associated with no optical filter. In the latter case the properties of the pixel itself determine its transmission characteristic.

The optical filters in the array of optical filters OF have a transmission characteristic which blocks or at least attenuates at the specified wavelength of the optical emitter. The optical filters may be interference filters such as an optical cut-off filter, bandpass, long or short pass filter, dielectric filters, Fabry-Perot filters and/or polymer filters. Typically, the passband is chosen with respect to a fluorescence probe to be studied and the optical filters pass light having a wavelength corresponding to the fluorescence emission of the probe.

First and second apertures AP1, AP2 are arranged into the cover section CS. The first and the second apertures AP1, AP2 are positioned above the optical emitter OM and the optical sensor OS, respectively. In fact, the apertures AP1, AP2 lie within an emission cone of the optical emitter OE and a field of view of the optical sensor OS, respectively. The emission cone includes all points in space that may, at least theoretically, be illuminated by the optical emitter OE, e.g. for a fixed emitter position and orientation. Similarly, the field of view of the optical sensor OS includes all points in space from where, at least theoretically, light after reflection at an external target TG may traverse towards the optical sensor OS, e.g. for a fixed detector position and orientation. Typically, the multispectral sensor is placed at a distance of 5 to 10 mm with respect to the external target TG, e.g. a fluorescent probe.

Optionally, optical systems can be arranged inside the first and second chambers CH1, CH2, respectively. For example, a first optical stack OS1 comprises a lens or system of lenses and is attached to the optical emitter inside the first chamber CH1. The first optical stack can be configured to guide and focus emitted light from the optical emitter towards target TG, which can be positioned in the FOV of the optical stack in a characteristic distance, for example. In addition, the optical stack OS1 may have optical filters or protective glass layers or windows, for example. The first and second chambers CH1, CH2 may be sealed with an optical window OW, respectively.

Furthermore, a second optical stack OS2 comprises a lens or system of lenses and is attached to the optical sensor OS inside the second chamber CH2. For example, the second optical stack OS2 comprises an array of micro-lenses AM wherein individual micro-lenses are associated with respective pixels of the optical sensor (see below). The array of micro-lenses AM may have additional black aperture layers and determine the FOV of the optical sensor OS. The micro-lenses can be adjusted in their optical properties (focal length, lens diameter, distance between lens and pixel, etc.) such that each associated pixel of the optical sensor OS is detecting light only from a defined region of the target TG. The optical properties of the micro-lenses may be adjusted in a way that the defined regions of the target TG do not overlap. In addition, the second optical stack OS2 may have further optical layers, e.g. optical filters, angular filters or protective glass layers or windows, for example. Furthermore, the second optical stack may also have an additional lens to narrow the FOV of the optical sensor, e.g. to 10 degrees or smaller.

The optical filters in the array of filters OF can be aligned with respect to the micro-lenses of the array of micro-lenses AM. This way each pixel of the optical sensor OS can be associated with an individual filter and/or micro-lens. However, not all pixels of the optical sensor OS may be associated with an individual filter and/or micro-lens as will be discussed in further detail below.

A control unit CU and a measurement unit MU are integrated into the semiconductor die SD alongside with the optical sensor OS. The control unit CU comprises a driver for the optical emitter OE. For example, the control unit CU initiates emission of light by the optical emitter OE. Emission of the optical emitter can be modulated, e.g. pulsed or modulated by a continuous wave. In operation, the optical emitter OE emits light at the specified wavelength which illuminates a target TG outside the multispectral sensor, for example. The measurement unit MU can be considered a control unit for the optical sensor. For example, it provides sensor signals which are generated by the optical sensor. The control unit and measurement unit may be implemented as control logic, state machines, microprocessor and the like. They may also comprise additional components such as analog-to-digital converters, time-to-digital converters, amplifiers which too are located in the semiconductor die SD. The semiconductor die SD may have a printed circuit board PCB providing electrical communication to the individual components of the multispectral sensor.

In operation the external target TG, e.g. a fluorescent probe hereinafter, is positioned in the FOV of the multispectral sensor. For example, the target is positioned at a distance of 5 to 10 mm with respect to the sensor. The control unit CU initiates pulsed emission of light by means of the optical emitter OE through the first aperture AP1 and towards the external target. The emitted light has the specified wavelength. Upon excitation, the external target TG, e.g. a fluorescent probe, will eventually emit light at a longer, red-shifted wavelength than that of the excitation light. The transmission of the filters is arranged to pass light which is red shifted with respect to the specified emission wavelength of the optical emitter OE. Thus, the emitted fluorescence is filtered out against scattered excitation light or background by means of the optical filters.

Fluorescence photons can be detected via the second aperture AP2 by means of the optical sensor OS. A pixel of the first type denoted sensor pixel hereinafter, generates a multispectral sensor signal MS, respectively. A pixel of the second type Cpx, denoted compensation pixel hereinafter, generates a compensation sensor signal, respectively. The measurement unit MU provides a set of multispectral sensor signals and a set of compensation sensor signals. These signals can be processed to determine a radiance distribution signal RDS, which may be representative of how a radiance, e.g. fluorescence emission after excitation, is distributed over the target TG.

Typically, the optical sensor OS is not evenly illuminated depending on measurement geometry, surface, shape and angle of the target, geometrical angel distribution of glossy and reemission and also the radiance distribution of the optical emitter OE. In turn, the fluorescence as detected by the multispectral sensor signals is not homogeneous either and there may be a need to compensate for these effects. The radiance distribution signal RDS comprising, or being constructed from, the compensation sensor signals allows for determining a spectral distribution signal as a result of signal processing. This processing can be executed on-chip, e.g. by means of a dedicated processing unit PU integrated into the semiconductor die SD of the multispectral sensor (not shown), or by an external computing unit. Details will be discussed below.

Figure 2:
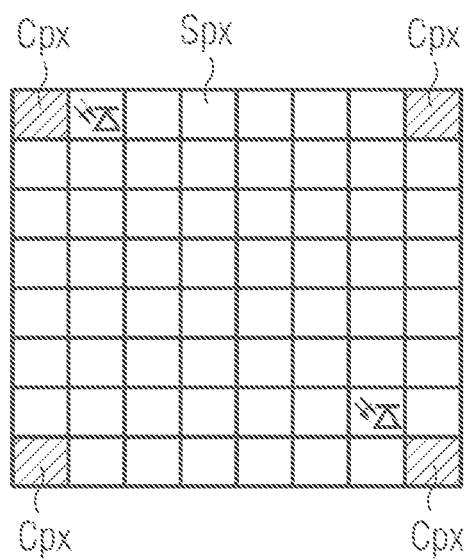
FIG. 2 shows an embodiment of an optical sensor for a multispectral sensor.

FIG. 2 shows an embodiment of an optical sensor for a multispectral sensor. The drawing shows a top-view of the array of pixels which are arranged in an 8×8 configuration. Four compensation pixels Cpx are symmetrically distributed over and are located in the corners of the pixel array. The remaining pixels are sensor pixels Spx. The arrays of micro-lenses ML and optical filters OF are not shown in this representation but are aligned with the pixels in the pixel array. For example, the optical filters are implemented as Fabry-Perot filters.

Figure 3:
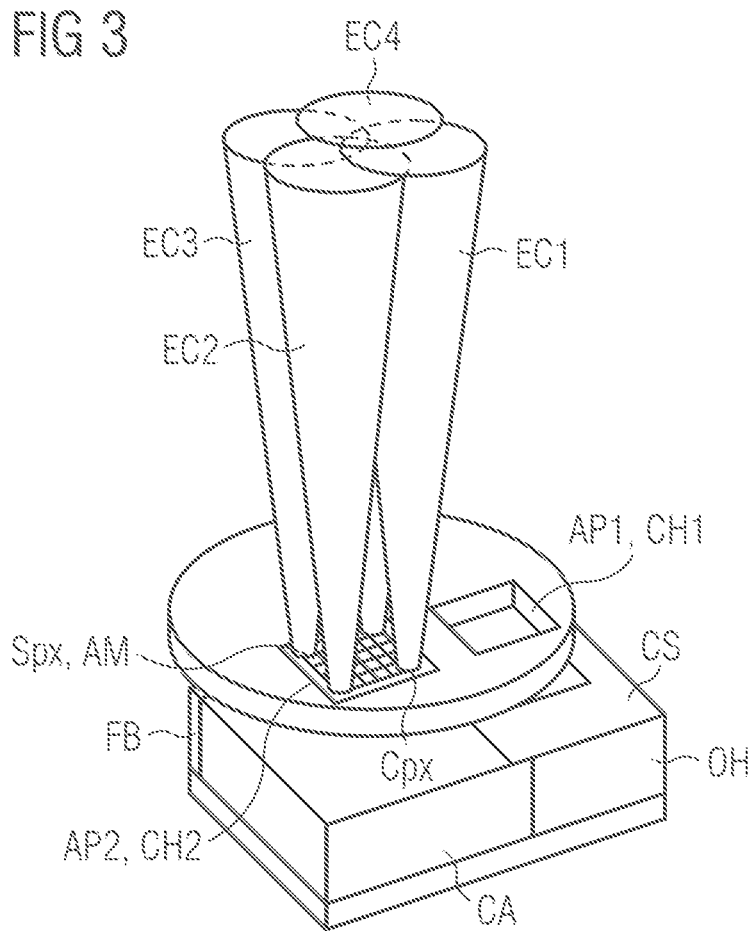
FIG. 3 shows an example detection scheme using compensation pixels of an optical sensor for a multispectral sensor.

FIG. 3 shows an example detection scheme using compensation pixels of an optical sensor for a multispectral sensor. The drawing shows the multispectral sensor discussed with respect to FIGS. 1 and 2 in a perspective view including the opaque housing OH with first and second chambers CH1, CH2. The circular disk in the drawing indicates the field of view of the multispectral sensor. The optical sensor OS is depicted with an array of micro-lenses AM.

Four emission cones EC1 to EC4 are shown. These emission cones are attributed to the four compensation pixels Cpx arranged in the corners of the pixel array discussed in FIG. 2. In fact, the compensation pixels Cpx lie within corresponding emission cones EC1 to EC4 determined by fluorescence emission from the target TG and intersect with the field of view of the optical sensor OS (indicated by the disc in the drawing). In this example, the emission cones intersect at the position of the target and are used to construct the radiance distribution signal RDS from four compensation sensor signals CS generated by the four compensation pixels Cpx. However, any number of compensation pixels can be used.

Figure 4:
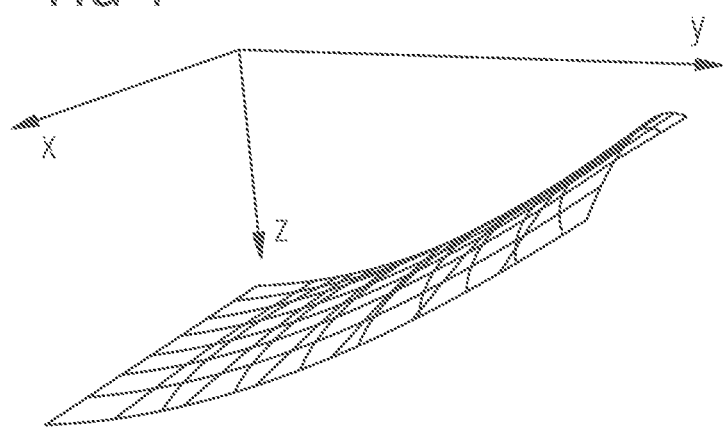
FIG. 4 shows an embodiment of a spectral sensitivity of pixels for a multispectral sensor.

FIG. 4 shows an example of a radiance distribution function for a multispectral sensor. The radiance distribution signal RDS or compensation sensor signals can be used to determine a target radiance distribution as a function of coordinates x, y, z, e.g. a power distribution of emission by regions on the target. The compensation pixels Cpx can be assumed to have a same spectral response or can be calibrated to have a same spectral response. In other words, defined intensities of incident light generate in value the same compensation signal. Thus, differences in compensation signal between the compensation pixels can be attributed to differences in target radiance distribution.

Often a radiance distribution signal is expected to resemble a certain mathematical function. For example, this function may represent a plane, a circular area or a hyperbolic function. The measured compensation sensor signals can be considered as parameters that help determining the radiance distribution function. For example, the compensation sensor signals determine the radiance distribution function at the compensation pixels Cpx. The values of the radiance distribution function at the sensor pixels can be determined from the function, e.g. by fitting, extrapolating and the like. Thus, the radiance distribution function is determined for all pixels and a radiance distribution signal can be generated to compensate for all pixels in the array.

This procedure may be considered a fitting operation to determine the radiance distribution function. The resulting radiance distribution signal can be used to calibrate the spectrum. Furthermore, radiance distribution signal can be used to extract additional information, such as tilting of the measured target, shape of the measured target, ratio of glossy and remission, and distance from target, e.g. by knowing of the radiance distribution of the optical emitter.

FIG. 5 shows example transmission characteristics of sensor pixels for a multispectral sensor. The drawing shows a number of 61 sensor pixels. The chart shows the spectral sensitivity IS (in arbitrary units) of the sensor pixels as a function of wavelength $\lambda$ (in nm) as an overlay of the sensitivity of the sensor pixels and respective transmission characteristics of the array of optical filters OF.

The transmission characteristics of the sensor pixels Spx are linearly independent and may be considered channels of the multispectral sensor. With linearly independent transmission characteristics only light of a defined wavelength is attributed to a certain channel or spectral pixel. For example, the transmission characteristics may be represented by a single linewidth or by a discrete set of linewidths, e.g. of a few nm such as 1 to 5 nm (FWHM). In terms of wavelengths the transmission characteristics of the spectral pixels are spaced apart such that there is no or only small spectral overlap, e.g. smaller than 1%. With linearly independent transmission characteristics of the sensor pixels Spx a detected photon may unambiguously be attributed to a respective pixel or channel. This facilitates creating a spectrum from the multispectral sensor signals.

The spectral sensitivity for spectrometric analyses can be achieved by the array of optical filters OF introduced above, e.g. based on Fabry-Perot effect. The filters can be arranged so that each sensor pixel has its own narrow spectral sensitivity. By combining the channels a spectral response distribution (or spectrum) of the measuring sample the characteristic can be created. This can be analyzed by algorithmic reconstruction methods.

The concept discussed before allows for a multispectral sensor which can be based on an array of sensor pixels. Each pixel has a known spectral characteristic. All sensor pixels are linear independent, e.g. each sensor pixel is sensitive for a narrow band of light. This can be UV, VIS, NIR and/or IR. Spectral information characteristic of a target can be reconstructed. The optical sensor can be complemented with optics to determine a field of view (FOV) of the multispectral sensor, e.g. for limiting the viewing area on the target. The optics can be a micro-lens array arranged close to the sensor array and/or a separate lens for optical imaging of the target area on the optical sensor. In fact, a position of a sensor pixel can be arranged to detect only from certain ranges on the target.

Compensation pixels can be distributed over the optical sensor, e.g. in corners of the array and may define the scope of the viewed target area. Compensation signals generated from these pixels can be used to estimate effects of inhomogeneous radiance. In order to recalculate information of target characteristic or radiance distribution of radiance sources it may be necessary that the compensation pixels have the same spectral sensitivities so that no spectral differences will be interpreted. The compensation pixels can be configured without a filter or with the same filter to improve independence. The filter of the compensation pixels can also be one part of the spectral measurement.

The compensation signals and their deviation can be used as parameters for describing an inhomogeneous radiance incident on the optical sensor. By knowing parts of other optical effects it may be possible to generate a model of a radiance gradient to compensate signal amplitudes of each sensor pixel by its position. The result of this compensation may result in a more robust reconstruction of a spectral target characteristic.

The invention claimed is:

1. A multispectral sensor comprising:
an opaque housing having a first chamber with a first aperture and a separate second chamber with a second aperture,
an optical emitter arranged in the first chamber and arranged to emit light of a specified wavelength or specified range of wavelengths through the first aperture,
an optical sensor arranged in the second chamber and arranged to detect received photons through the second aperture,
a control unit configured to initiate emission of light by the optical emitter, and
a measurement unit configured to provide sensor signals generated by the optical sensor;
wherein:
the optical sensor comprises an array of sensor pixels of a first type and pixels of a second type,
the pixels of the first type each have a different transmission characteristic, each generating a multispectral sensor signal, respectively, and
the pixels of the second type have a same transmission characteristic, each generating a compensation sensor signal;
further comprising a processing unit which is arranged to:
determine a radiance distribution signal depending on the compensation sensor signals, and
determine a spectral distribution signal depending on the radiance distribution signal.

2. The multispectral sensor according to claim 1, wherein the optical sensor is integrated into a single semiconductor die.

3. The multispectral sensor according to claim 1, wherein the different transmission characteristics of the pixels of the first type are linearly independent.

4. The multispectral sensor according to claim 1, wherein at least the pixels of the first type each comprise a photodiode and a filter, wherein the filter determines the transmission characteristic of the sensor pixel, respectively.

5. The multispectral sensor according to claim 4, wherein the filters are interference filters, dielectric filters, Fabry Perot filters and/or polymer filters.

6. The multispectral sensor according to claim 4, wherein the pixels of the second type
each comprise a photodiode and a filter, wherein the filter determines the transmission characteristic of the sensor pixel, respectively, or each comprise a photodiode.

7. The multispectral sensor according to claim 1, wherein the pixels of the second type are symmetrically distributed in the array of sensor pixels.

8. The multispectral sensor according to claim 1, wherein the pixels of the second type are located in corners of the array of sensor pixels.

9. The multispectral sensor according to claim 1, wherein additional pixels of the second type are located outside of the array of sensor pixels.

10. The multispectral sensor according to claim 1, further comprising output terminals to provide the compensation sensor signals and/or multispectral sensor signals for further processing.

11. The multispectral sensor according to claim 1, further comprising:
an optical lens array coupled to the array of sensor pixels and/or
an optical lens coupled to the first aperture of the housing.

12. The multispectral sensor of claim 1, wherein the processing unit is configured to scale the multispectral sensor signal generated by the pixels of the first type depending on the spectral distribution signal.

13. The multispectral sensor of claim 1, wherein each pixel of the first type (Spx) is defined by a photodiode and a single, respective interference or Fabry Perot filter, wherein each of the interference or Fabry Perot filters determines the transmission characteristic of each of the respective sensor pixels (Spx).

14. A method for multispectral light sensing, wherein a multispectral sensor comprises an opaque housing having a first chamber with a first aperture and a separate second chamber with a second aperture, the method comprising:
emitting light of a specified wavelength or range of wavelengths through the first aperture by means of an optical emitter arranged in the first chamber,
detecting received photons through the second aperture by means of an optical sensor arranged in the second chamber, wherein the optical sensor comprises an array of sensor pixels of a first type and pixels of a second type,
for each pixel of the first type generating a multispectral sensor signal, wherein the pixels of the first type each have a different transmission characteristic,
for each pixel of the second type generating a compensation sensor signal, wherein the pixels of the second type have a same transmission characteristic,
determining a radiance distribution signal depending on the compensation sensor signals, and
determining a spectral distribution signal depending on the radiance distribution signal.

15. The method according to claim 14, wherein the radiance distribution signal is combined with the multispectral sensor signals by means of a mathematical operation.

16. The method according to claim 14, wherein the radiance distribution signal is determined by means of a radiance distribution function.

17. The method according to claim 14, wherein determining the radiance distribution signal and/or determining the spectral distribution signal is executed external to the optical sensor or by means of a processing unit comprised by the optical sensor.

18. The method of claim 14, further comprising scaling the multispectral sensor signal generated by the pixels of the first type depending on the spectral distribution signal.

19. The method of claim 14, further comprising defining each pixel of the first type (Spx) by a photodiode and a single, respective interference or Fabry Perot filter, wherein each of the interference or Fabry Perot filters determines the transmission characteristic of each of the respective sensor pixels (Spx).

20. A multispectral sensor comprising:
an opaque housing having a first chamber with a first aperture and a separate second chamber with a second aperture,
an optical emitter arranged in the first chamber and arranged to emit light of a specified wavelength or specified range of wavelengths through the first aperture, an optical sensor arranged in the second chamber and arranged to detect received photons through the second aperture,
a control unit configured to initiate emission of light by the optical emitter, and
a measurement unit configured to provide sensor signals generated by the optical sensor;
wherein:
   the optical sensor comprises an array of sensor pixels of a first type and pixels of a second type,
   the pixels of the first type each have a different transmission characteristic, each generating a multispectral sensor signal, respectively, and
   the pixels of the second type have a same transmission characteristic, each generating a compensation sensor signal,
further comprising a processing unit which is arranged to:
   determine a radiance distribution signal depending on the compensation sensor signals, and
   determine a spectral distribution signal depending on the radiance distribution signal; and
   wherein the sensor pixels of the first type each have a smaller field of view on an illuminated target than a field of view of the emitter on the illuminated target.

21. The multispectral sensor according to claim 20, wherein the optical sensor is integrated into a single semiconductor die.

22. The multispectral sensor of claim 20, wherein the processing unit is configured to scale the multispectral sensor signal generated by the pixels of the first type depending on the spectral distribution signal.

23. The multispectral sensor of claim 20, wherein each pixel of the first type (Spx) is defined by a photodiode and a single, respective interference or Fabry Perot filter, wherein each of the interference or Fabry Perot filters determines the transmission characteristic of each of the respective sensor pixels (Spx).

\* \* \* \* \*